United States Patent [19] [11] 3,934,181
Rosenthal [45] Jan. 20, 1976

[54] SOLID STATE LIGHT RESPONSIVE CONTROL SYSTEM

[76] Inventor: Ben J. Rosenthal, 9140 Kildare, Skokie, Ill. 60076

[22] Filed: Jan. 15, 1974

[21] Appl. No.: 433,549

Related U.S. Application Data

[63] Continuation-in-part of Ser. No. 315,791, Dec. 17, 1972.

[52] U.S. Cl. .................................. 318/53; 180/6.5
[51] Int. Cl.² ......................................... B62D 11/04
[58] Field of Search .......... 318/53 X, 345; 200/6 A; 250/237 R, 237

[56] References Cited
UNITED STATES PATENTS

| | | | |
|---|---|---|---|
| 3,370,293 | 2/1968 | Green | 343/119 |
| 3,582,744 | 10/1971 | Coffey | 318/345 |
| 3,613,813 | 10/1971 | Biddle | 200/6 A |
| 3,811,047 | 5/1974 | Ihragal | 250/237 R |

*Primary Examiner*—Robert K. Schaefer
*Assistant Examiner*—John W. Redman
*Attorney, Agent, or Firm*—Neuman, Williams, Anderson & Olson

[57] ABSTRACT

The control system includes a plurality of light responsive devices and a mask structure having a part which is movable with respect to the devices to control the transmission of light thereto. The movable part of the mask structure may be a ball-like member, which is universally supported in a spherical receptacle which supports the light responsive devices. Four light responsive devices may be used, with the mask structure having a portion with a variable width slot associated with each device, so that as the ball-like member is pivoted universally to control the light transmitted through the slots to the devices, electrical signals are produced which represent the movement. The light responsive devices have an electrical characteristic which changes with the light applied thereto to produce electrical signals, and are connected in a control circuit so that signals therefrom control apparatus, such as drive units for controlling the movement of a device. The ball-like member can control switches connected in the circuit to control the direction of operation of the drive units.

15 Claims, 9 Drawing Figures

U.S. Patent    Jan. 20, 1976    Sheet 2 of 2    3,934,181
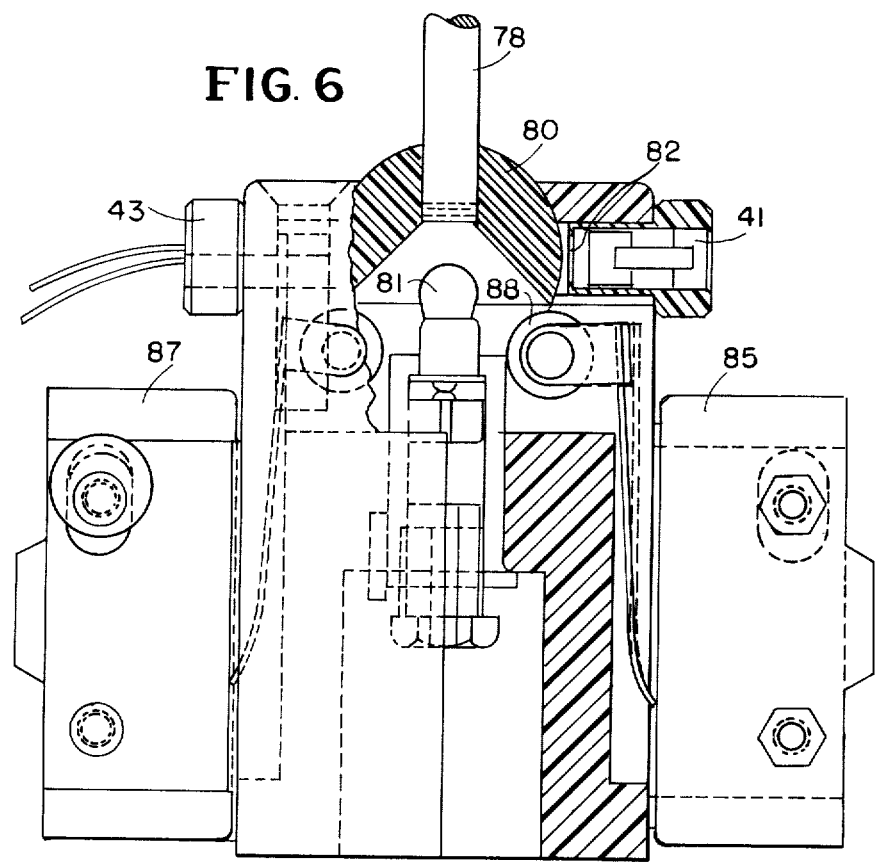
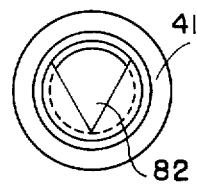
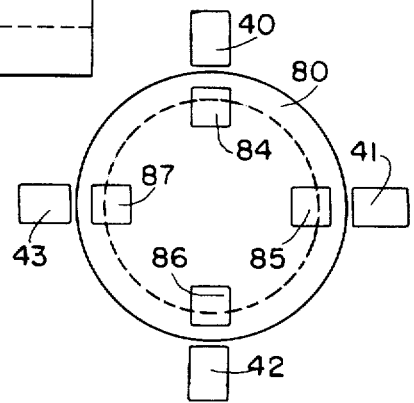
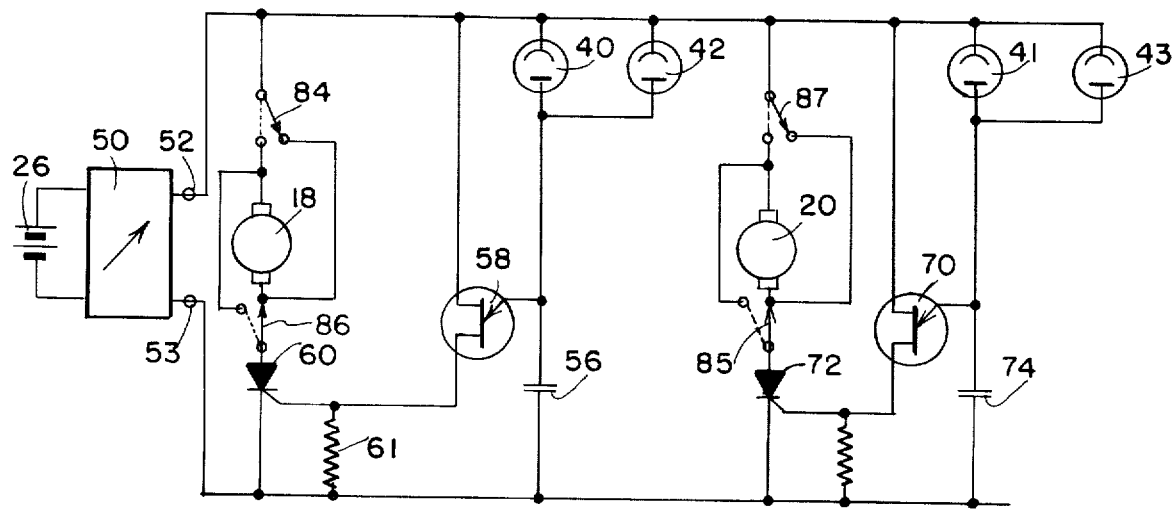

SOLID STATE LIGHT RESPONSIVE CONTROL SYSTEM

This application is a continuation-in-part of application Ser. No. 315,791, filed Dec. 18, 1972.

BACKGROUND OF THE INVENTION

Control systems are required for controlling the positioning or movement of various devices which can operate in any direction in a plane. That is, movement may be required along a first axis, or along a second axis at right angles to the first axis, or along any line between the axes. One application for such a control is in a motor driven wheelchair or cart having two motors for respectively driving the two wheels of the chair, as described and claimed in U.S. Pat. No. 3,100,860, issued Aug. 13, 1963 to Harry Rosenthal. In this drive, a joy stick operator controls an actuator which operates four leaf switch assemblies to control the direction and speed of the two motors to propel the chair in any direction within the plane. Although this drive control has been highly satisfactory in use, it has the objection of any electrical switch apparatus that the contacts deteriorate with use, and that the speed control provided by operation of the various leaves of the switches produces step changes in speed, rather than a continuous change. Auxiliary controls can be used to provide continuous variations in speed, but this has the objection that a different actuator is required for the auxiliary controls. Further, the structure must be relatively large to provide the degree of control which is desired, and an auxiliary speed control further increases the size of the unit.

A multi-axis control system is required for other applications, such as in an audio system for controlling the volume and/or tone, and for controlling the balance in a multichannel system.

SUMMARY OF THE INVENTION

It is an object of the present invention to provide an improved multi-axis optical control system which has no movable part other than the actuator and mask connected thereto.

Another object of the invention is to provide a control system including a plurality of photoelectric devices and a movable mask structure for controlling the application of light thereto, so that the devices provide signals for controlling apparatus in accordance with the movement of an actuator for the mask structure.

A further object of the invention is to provide a joy stick type control unit having an actuator connected to a spherical member forming a mask for moving the same to control the light from a source which is directed onto a plurality of light responsive devices, with the mask further having portions adjacent the devices shaped to control the light applied to the devices in response to movement of the actuator.

A still further object of the invention is to provide a control system for electrical apparatus including a plurality of light responsive devices each controlling the current applied to charge a capacitor in accordance with the received light, and wherein the voltage across the capacitor acts through a trigger circuit to control a rectifier to thereby control the current supplied to the electrical apparatus.

A still further object of the invention is to provide a positioning system for moving an object in any direction in a plane by use of two electrical drive units, each of which can be reversed in direction and controlled in speed, and wherein an actuator moves a mask with respect to four right angle positioned light responsive devices, each of which controls the operation of one drive unit in one direction.

In practicing the invention, a control system is provided including a plurality of light responsive devices and a mask structure including a movable portion for controlling the light applied to the individual devices. The control system can be used for controlling drive units to thereby control the movement or position of a device. The device may be a wheelchair or other vehicle for carrying a person, or some other device which is controlled in a balanced manner. The light responsive devices have an electrical characteristic which varies with the light applied thereto, such as photo semiconductors or photoelectric cells. An actuating member moves at least a portion of the mask structure, which has portions adjacent the devices for controlling the light applied thereto. The mask can include a spherical member which moves universally within a support on which the devices are mounted, with portions on the mask or on the support shaped to provide a desired variation of the light with the movement. For controlling movement in any direction in a plane, four devices are positioned at 90° positions about the light source, and the mask has four portions, one adjacent each of the devices.

A plurality of electrically responsive units can be controlled by the system, such as two motors which are reversible in response to direct current of opposite polarities, and which have speeds dependent upon the amount of current supplied. Current can be supplied to each motor from an alternating current supply through a pair of rectifiers, each providing current of one polarity. Each rectifier is triggered by a circuit connected to one of the light responsive devices in accordance with the light applied thereto. The half cycles of each polarity of the alternating current are controlled by a circuit including a capacitor connected in series with a light responsive device, and the voltage across the capacitor controls a unijunction transistor which in turn controls a silicon controlled rectifier. Each half cycle of one polarity charges the capacitor at a rate dependent upon the resistance of the light responsive device to trigger the unijunction transistor at a point in the cycle which varies with the light applied. As more light is applied, the capacitor charges more rapidly to fire the unijunction transistor earlier in the half cycle to apply more current to the motor, so that it runs at a faster speed. Each of the two motors is controlled for rotation in the opposite directions by two devices, each of which controls the current to the motor in one direction. The four devices, therefore, control relative forward and reverse rotation of the two motors to cause movement in any direction within a plane. Other electrical apparatus than motors can be similarly controlled.

In one embodiment of the invention, switches are provided which control the connections to the motors, or other drive units, to control the direction of operation thereof. The switches are operated by the mask structure as it controls the light applied to the light responsive devices.

BRIEF DESCRIPTION OF THE DRAWINGS

FIGS. 6 to 9 show a second embodiment of the control system of the invention.

DETAILED DESCRIPTION

Figure 1:
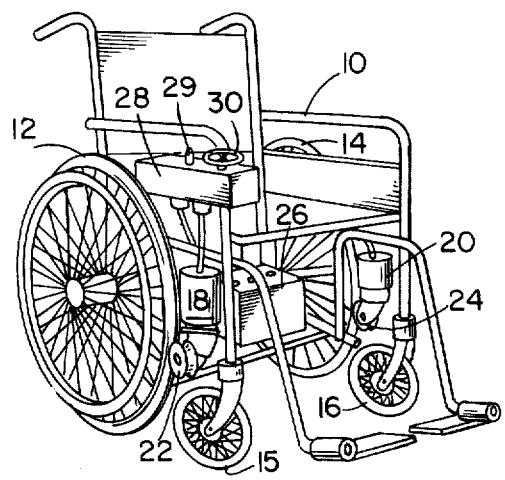
FIG. 1 is a perspective view of a wheelchair including the control system of the invention.

In FIG. 1 there is shown a wheelchair which utilizes the control system of the invention. It is pointed out that the wheelchair is only an example of devices which can be controlled by the system. Any other device having electrically operated units for controlling the same, or an element thereof, can be so controlled.

The wheelchair of FIG. 1 has a frame 10 supported by main wheels 12 and 14 on opposite sides thereof, and front wheels 15 and 16, which are pivotally mounted to the frame. Drive units are provided on opposite sides of the chair including drive motors 18 and 20, each of which has connected thereto appropriate gearing and drive wheels 22 and 24 which engage the main wheels 12 and 14 of the wheelchair. The drive motors 18 and 20 are energized from a battery 26, which may be supported at the back of the wheelchair, through control unit 28. The control unit 28 includes a power switch 29 and an actuator arm 30 to control the direction of rotation and speed of the motors 18 and 20, as will be described.

Figure 2:
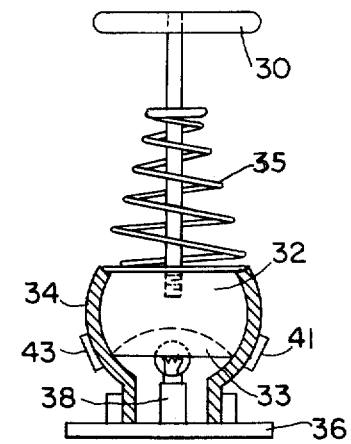
FIG. 2 is a view partly in section of the actuator for the control system.

FIG. 2 is a cross-sectional view, partly in section, of the actuator for the control system. This includes the actuator arm 30 which extends above the control unit 28 to be operated by the person using the chair. The arm 30 is connected to an opaque member 32 which is of generally spherical configuration having a concave recess 33 at the bottom. The spherical member 32 is positioned in a spherical support 34, which may also be of opaque material. The support 34 is secured to a base 36 which may be mounted in the control unit 28. Also supported on the base 36 is a lamp 38, with the illuminating portion thereof extending into the concave recess 33 in the sperical member 32. This permits movement of the member 32 within the support 34, without interference from the lamp 38. The spring 35 acts to return the arm 30 to its normal position.

Positioned on the support 34 at 90° positions thereabout, are light responsive devices 40, 41, 42 and 43 which have an electrical characteristic which changes with the amount of light applied thereto. These devices may be photosemiconductors, or photoelectric cells, the resistance of which is reduced with the light applied. Although only two devices 41 and 43 are shown in FIG. 2, two more devices 40 and 42 are also provided on support 34, which are shown in FIG. 3.

Figure 3:
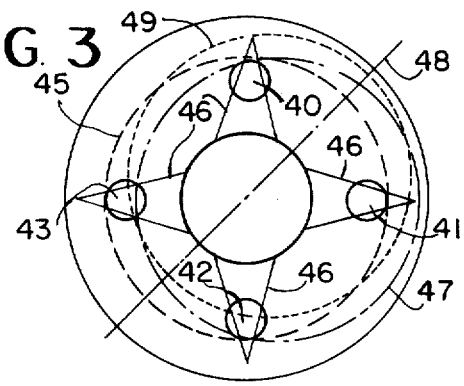
FIG. 3 is a developed view of the mask structure of the actuator.

The spherical surface of the member 34 forms a mask, and has four transparent triangular slots 46 which are shown in developed form in FIG. 3. These slots 46 are adjacent the light responsive devices and form apertures for the passage of light. These slots or apertures 46 cooperate with member 32 to control the amount of light from the lamp 38 which falls on the respective devices 40, 41, 42 and 43, as the opaque member 32 moves within the support 34. The normal position of the opaque member 32 is shown by the dashed line 45 in FIG. 3, and in this position it blocks the passage of light to all the devices 40 to 43. The shape of the apertures can be selected to control the amount of light applied to the devices in response to movement of the arm 30. It will be apparent that the light transmitting apertures can be formed by making the support 34 of transparent material, with a mask thereon having the configuration shown in FIG. 3.

The spherical member 32 can move universally within the sperhical support 34, and can move toward the device 41, as shown by the dot-dash line 47 in FIG. 3. This exposes a part of the triangular aperture or slot 46 adjacent the device 43, so that some light is provided on this device. The arm 30 can be moved in the opposite direction to expose light on device 41, and not on device 43, and can likewise move to pass more or less light to the devices 40 and 42. Also, the arm 30 can move member 32 in directions other than toward one of the devices and can move, for example, in the direction of the dot-dash line 48, intermediate the devices 40 and 41. The member 32 will then be in the position shown by the dotted line 49 in FIG. 3. In this position, no light is applied to both of the two devices 40 and 41, and some light is applied to the devices 42 and 43. The actuator can be mounted on the control unit so that the line 48 represents the front to back direction of the wheelchair, and movement of actuator arm 30 along the line 48 will control the movement of the chair in forward and backward directions, as will be explained.

Figure 4:
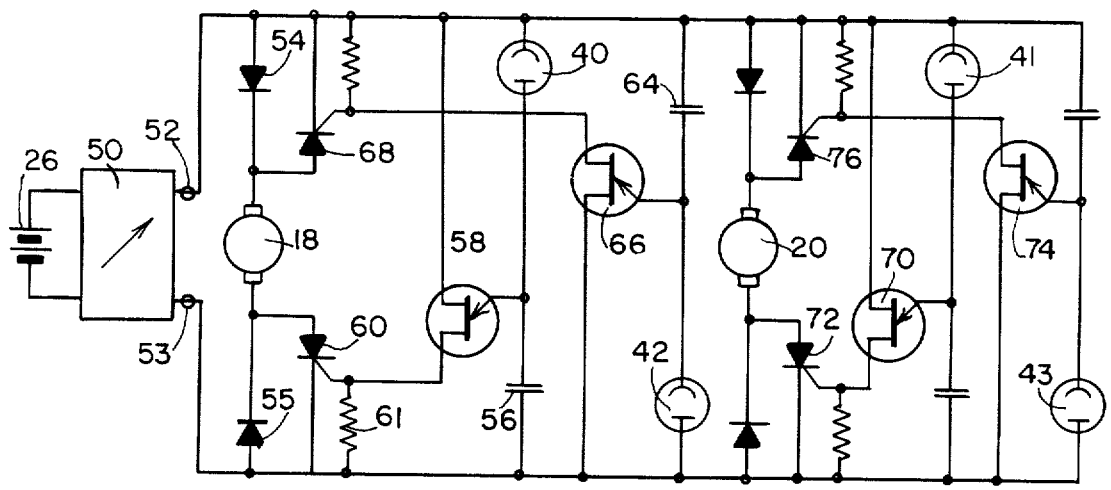
FIG. 4 shows the circuit connected to the light responsive devices of the actuator for controlling the drive motors.

FIG. 4 shows a control circuit which may be used for controlling the speed and direction of rotation of the motors 18 and 20 (FIG. 1) in response to the light received by the devices 40, 41, 42 and 43. Direct current from the battery 26 is converted to alternating current by inverter 50. A variable control may be provided for controlling the level of the alternating current at the output terminals 52 and 53 of the inverter 50. This output may be a 60 cycle alternating current output having a voltage of the order of 12 volts.

The motor 18 is connected across the alternating current output of inverter 50 in series with rectifiers 54 and 55. Each rectifier blocks current in one direction, so that no current can flow therethrough to motor 18. Each rectifier 54 and 55 is bypassed by a control circuit coupled to one of the light responsive devices 40 and 42. Connected in series with device 40 is capacitor 56, which charges from the alternating current at a rate depending upon the resistance of device 40. The resistance of device 40 is high when no light is applied thereto, and is substantially reduced when light is applied to provide current flow to charge capacitor 56. The voltage across capacitor 56 is applied to the emitter of unijunction transistor 58, and when this voltage reaches a predetermined value, transistor 58 conducts. Unijunction transistor 58 is connected to the gate of silicon controlled rectifier 60 which is bridged across the diode 55. This causes the rectifier 60 to fire so that an energizing circuit is provided for the motor 18 through diode 54 and silicon controlled rectifier 60 during the half cycles of the alternating current when terminal 52 is positive with respect to terminal 53. The resistor 61 connected to the gate of silicon controlled rectifier 60 clamps the gate to prevent false triggering.

The light responsive device 42 is connected to a similar circuit including capacitor 64 and unijunction transistor 66, which is coupled to the gate of silicon controlled rectifier 68. When the resistance of device 42 decreases, the capacitor 64 will charge more rapidly on each cycle to trigger unijunction transistor 66, which provides a voltage to the gate of silicon controlled rectifier 68 to fire the same. This provides a circuit for energizing motor 18 through diode 55 and silicon controlled rectifier 68 during the half of the cycle of the alternating current from the inverter 50 when terminal 53 is positive and terminal 52 is negative.

The devices 41 and 43 are connected to circuits for controlling the energization of motor 20 from the alternating current applied at terminals 52 and 53 of inverter 50. These circuits may be identical to the circuits connected to devices 40 and 42. When light is applied to device 41, this will trigger unijunction transistor 70 to fire silicon controlled rectifier 72 during the half cycles of the alternating current when terminal 52 is positive and terminal 53 is negative. Similarly device 43 triggers unijunction transistor 74 to fire silicon controlled rectifier 76 to apply current to motor 20 when the inverter terminal 53 is positive and the inverter terminal 52 is negative.

The portion of each half cycle during which current is supplied to the motor by the control circuit depends upon the time required for the capacitor in series with the light responsive device to charge to a value to render the associated unijunction transistor conducting. When the transistor conducts, it fires the silicon controlled rectifier coupled thereto to energize the associated motor and cause it to rotate in one direction. The speed of rotation will depend upon the portion of each half cycle during which current is applied. When the resistance of the light responsive device is reduced greatly in response to the application of more light thereto, the capacitor will charge rapidly to cause the rectifier to fire rapidly. This applies current to the motor during a large portion of the cycle to cause it to rotate faster.

When the silicon controlled rectifier 60 fires, the motor 18 will tend to rotate in one direction, and when rectifier 68 fires, the motor will tend to rotate in the opposite direction. Similarly, motor 20 rotates in one direction when light is applied to device 41 to trigger unijunction transistor 70 and fire silicon control rectifier 72, and in the opposite direction when light is applied to device 43 to trigger transistor 74 and fire rectifier 76.

When the control device is used in a wheelchair as illustrated in FIG. 1, the actuator is positioned so that the center line 48 shown in FIG. 3 extends in the front to back direction of the chair, as previously stated. When the actuator arm 30 is moved forward, no light is directed on light responsive devices 40 and 41, and some light is directed on light responsive devices 42 and 43. This will cause rectifiers 68 and 76 in the control circuit of FIG. 4 to conduct current to energize motors 18 and 20. The rotation of motors 18 and 20 will be in the direction to cause the wheels 12 and 14 to rotate to move the chair forward. The operation is such that the person in the chair moves the arm 30 in the direction which he wants to move. If the arm 30 is moved backward, some light will be applied to devices 40 and 41, which will cause rectifiers 60 and 72 to conduct and energize the motors 18 and 20 for rotation in the opposite direction, to thereby move the chair backward. When the actuator is moved to the right, no light will be applied to devices 41 and 42 and some light will be applied to devices 40 and 43. This will cause rectifiers 60 and 76 to conduct and energize motor 18 to turn wheel 12 in the backward direction, and energize motor 20 to turn wheel 14 in forward direction, so that the chair will turn to the right. It is obvious that movement of the actuator in intermediate directions will cause the chair to move in intermediate directions.

Figure 5:
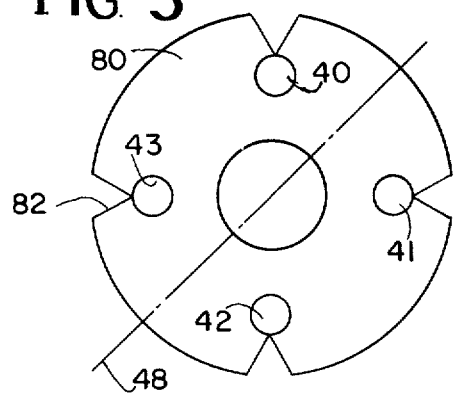
FIG. 5 shows a variation of the mask structure of FIG. 3.

In FIG. 5, there is illustrated a second embodiment of the actuator for the control system. In this embodiment, the spherical member 32 (FIG. 2) is transparent with an opaque coating 80 thereon which forms the mask. The coating 80 is shown in FIG. 5 in developed form. This forms a mask to cover all four light responsive devices 40 to 43, inclusive, in its normal unactuated position. The mask 80 has V-shaped slots or apertures 82 adjacent the devices, and as the member 32 and mask 80 thereon move in the direction away from one device, the aperture 82 will expose this device so that light from the source 38 is applied thereon. In this construction, the support 34 may also be made of transparent material, or can be made of opaque material with openings at the light responsive devices to allow the passage of light thereto. The actuator illustrated by FIG. 5 can be used in the circuit of FIG. 4, and will provide the same operation which has been described.

FIGS. 6, 7, 8 and 9 show an alternate embodiment of the system which includes many of the same features as the system in FIGS. 2 to 4. A spherical mask 80 is rotatably supported with respect to light responsive devices 40, 41, 42 and 43 set at right angle positions, as in the prior embodiment. The structure of the light responsive devices is shown in FIGS. 6 and 7, with FIG. 7 showing the V-shaped aperture 82 which cooperates with the edge of the spherical mask 80 to control the light from the lamp 81 which falls on the light responsive devices.

In addition to controlling the light on the light responsive devices, the mask 80 also actuates switches 84, 85, 86 and 87 which are positioned at right angles with respect to each other. These switches can be commercially available microswitches which are highly reliable. Each switch is mounted immediately below one of the light responsive devices. As shown in FIG. 6, the switch 87 has an actuator extending therefrom with a roller 88 to be engaged by the edge of the spherical mask 80. Accordingly, when the actuating arm 78 moves the mask 80, the switches 84 to 87 are selectively operated.

It is apparent from FIG. 6 that as the actuator 78 is moved to the right, the actuator 88 of the switch 85 is moved toward the right to the dotted position, and this actuates the switch 85. This movement of the mask 80 will provide light on the light responsive device 43, which is opposite to the switch 85 which is actuated.

FIG. 9 shows the interconnection of the switches 84 to 87 in circuit with the light responsive devices 40 to 43, and connected to the motors 18 and 20 of the drive system for controlling the direction and speed thereof. Each of the switches is a double throw switch and the switches are shown in FIG. 9 in their unoperated position. When each switch is operated, it provides the connection shown by the dotted lines in FIG. 9. It will be noted that when no switch is operated, the motors 18 and 20 are disconnected on at least one side thereof, so that no current can flow to the motors.

The switches 84 to 87 reverse the direction of current flow to the motors 18 and 20, so that the same silicon controlled rectifier circuit can be used to control each motor for both directions of rotation. When the actuator 78 of FIG. 6 is moved to the right, as previously mentioned, this will cause the mask 80 to engage actuating arm 88 of switch 85 to operate this switch. This will cause the switch 85 to have the dotted position shown in FIG. 9, so that the motor 20 will be energized for rotation in one direction. Then when the mask 80 moves to allow light from the lamp 81 to fall on light responsive device 43, this will cause capacitor 74 to charge to actuate the unijunction transistor 70. Transistor 70, in turn, causes silicon controlled rectifier 72 to fire to complete the circuit from the battery 26 to the motor 20.

It is noted that operation of switches 85 and 87 control the direction of the current supply to the motor 20, and when switch 87 is operated the motor 20 will rotate in the opposite direction as when switch 85 is operated. This makes it possible to connect the two light responsive devices 41 ad 43, which are on opposite sides of the mask 80, to the same control circuit, since the direction of rotation of the motor 20 is controlled by operation of the switches 85 and 87. This simplifies the control circuit and insures that the motor is disconnected when none of the switches is actuated. This prevents operation of the motor in the event of some defect or failure in the control circuit.

Similarly, the light responsive devices 40 and 42 are connected to the same control circuit which includes unijunction transistor 58 and silicon controlled rectifier 60. The microswitches 84 and 86 control the connections to motor 18 so that it can be energized only when one of the switches is operated, and the direction or rotation is determined by the microswitch which is operated.

As in the prior embodiment, the actuator 78 can move the mask 80 to a position to operate two adjacent switches, to cause the two motors to rotate in the same direction to propel the chair forward or backward. In can also be operated to actuate two adjacent switches to cause the two motors to operate in reverse directions to cause the chair to turn. The speed of rotation depends upon the extent of movement of the mask, which controls the amount of light applied to the light responsive devices. This operation is exactly the same as previously described.

In the system of FIGS. 6 to 9, wherein the direction of rotation of the motors is controlled by the microswitches, the light responsive control circuit is simplified and a single circuit is used for both directions of rotation. This makes it possible to use other known electronic control circuits, which may be preferable in certain applications.

The control system of the invention provides effective control in a multi-axis system and has no moving members other than the actuator and mask connected thereto. This contrasts with prior systems which use leaf switches and other moving elements for control. In the system of FIGS. 6 to 9 the switches may be standard switches which are highly reliable and have long life. The use of these switches simplifies the control circuit and insures that the drive units are not energized when the control arm is in the normal position, even if a transistor. The control also is continuous, and can be made to respond in a desired manner with movement of the actuator by shaping of the apertures in the mask.

I claim:

1. A control system, including in combination:
light supply means;
a plurality of light responsive means having an electrical characteristic which changes with the light applied thereto;
electrical drive means operable in various modes in accordance with the electrical current applied thereto;
circuit means coupled to said light responsive means and to said drive means for supplying an electrical signal to said drive means which varies with the magnitude of light striking said light responsive means from said light supply means; and
mounting and masking means comprising a support defining a spherical receptacle surface portion and supporting said light responsive means in fixed spaced relationship adjacent said spherical receptacle surface, mask means comprising a spherical insert surface portion mounted within said spherical receptacle surface portion for universal movement relative thereto, said mask means defining a cavity within said spherical insert surface which receives light from said light supply means,
said spherical surface portions having areas of differing light transmitting characteristics which are in overlying relationship and shaped to cooperatively control the amount of light striking said light responsive means as a function of the relative positions of said cooperating spherical surface portions.

2. A control system of claim 1 wherein said spherical insert surface portion is opaque, and said spherical receptacle surface portion includes a pattern of diaphanous areas adjacent said light responsive means, whereby said amount of light striking said light responsive means varies as the relative positions of said spherical insert surface portion and said spherical receptacle surface portion is changed.

3. A control system of claim 2 wherein said light responsive means comprise photosemiconductor devices.

4. A control system of claim 2 wherein said movement of said spherical insert surface portion is controlled by actuating means coupled thereto, said actuating means being biased toward a predetermined neutral position by resilient biasing means and universally movable therefrom.

5. A control system of claim 1 wherein
said spherical insert surface portion includes diaphanous areas of varying width adjacent each of said light responsive means, whereby said amount of light striking said light responsive means varies as the relative positions of said spherical insert surface portion and said spherical receptacle receptacle surface portion is changed;
said light responsive means comprise photosemiconductor devices; and
said movement of said spherical insert surface portion is controlled by actuating means coupled thereto, said actuating means being biased toward a neutral position by resilient biasing means and universally movable therefrom.

6. A control system of claim 2 wherein said light responsive means comprises four light responsive devices located in a fixed spaced relationship and distributed about said spherical receptacle surface portion to exhibit an array of electrical characteristics correpsonding to the orientation of said spherical insert surface portion and responsive to movement thereof and produces orthogonally related drive signals.

7. The control system of claim 1 including switching means proximate said spherical insert surface portion comprising a plurality of electrical switching devices coupling said circuit means to said drive means, said electrical switching devices being selectively operable in accordance with the movement of said spherical insert surface portion.

8. The control system of claim 5:
wherein said light responsive means consists of a plurality of photosemiconductor devices located in fixed space relationship and distributed about said spherical receptacle surface portion to exhibit an array of electrical characteristics corresponding to the orientation of said spherical insert surface portion, and
wherein said control system includes switching means proximate said spherical insert surface portion comprising a plurality of electrical switching devices coupling said circuit means to said drive means, said electrical switching devices being selectively operated in accordance with the movement of said spherical insert surface portion to alter the polarity of the signals applied to said drive means.

9. A control system of claim 6 wherein said orientation of said spherical insert surface portion is controlled by actuating means coupled thereto, said actuating means being biased toward a neutral position and free to move universally therefrom.

10. The control system of claim 9 wherein
said switches control the direction of electric current supplied to said drive means, said direction corresponding to the orientation of said actuating means and said switches supply no current to said drive means when said actuating means is in said neutral position, and
wherein said mask means prevents light from striking said light responsive devices when said actuating means is in said neutral position.

11. The control system of claim 6 wherein said drive means includes first and second drive motors, and said circuit means includes a first circuit coupled to each of said drive motors for selectively applying current thereto and a second circuit coupling said light responsive devices to said first circuit for controlling the conductivity thereof.

12. The control system of claim 9 wherein said light responsive means consists of four light responsive devices distributed at equal intervals about said spherical receptacle surface, and including four electrical switching devices, each positioned adjacent one of said light responsive devices, said electrical switching devices coupling said circuit means to said drive means and being selectively operated by said spherical insert surface to control the polarity of the signals to said drive means.

13. A position sensing device comprising:
light supply means;
a plurality of light responsive means having an electrical characteristic which changes with the light applied thereto;
circuit means coupled to said light reponsive means for producing an electrical signal corresponding to the magnitude of light striking said light responsive means from said light supply means; and
mounting and masking means comprising a support defining a spherical receptacle surface portion and supporting said light responsive means adjacent said spherical receptacle surface,
mask means comprising a spherical insert surface portion mounted within said spherical receptacle surface portion for universal movement relative thereto,
said mask means defining a cavity within said spherical insert surface which receives light from said light supply means; and
said spherical surface portions having areas of differing light transmitting characteristics which are in overlying relationship and shaped to cooperatively control the amount of light striking said light responsive means as a function of the relative positions of said cooperating spherical surface portions.

14. A position sensing device of claim 13 wherein said spherical insert surface portion is opaque, said spherical receptacle surface portion includes diaphanous areas of varying width adjacent said light responsive means, and said amount of light striking said light responsive means varies as the relative positions of said spherical insert surface portion and said spherical receptacle surface portion is changed.

15. A position sensing device of claim 14 wherein said light responsive means consists of four light responsive devices located in a fixed spaced relationship and distributed about said spherical receptacle surface portion to exhibit an array of electrical characteristics corresponding to the orientation of said spherical insert surface portion and responsive to movement thereof.

* * * * *

UNITED STATES PATENT OFFICE
CERTIFICATE OF CORRECTION

Patent No. 3,934,181     Dated January 20, 1976

Inventor(s) Ben J. Rosenthal

It is certified that error appears in the above-identified patent and that said Letters Patent are hereby corrected as shown below:

Under "Related U. S. Application Data"
        Continuation in part appln. 315,791 has
        a filing date of December 17, 1972.
        Should be December 18, 1972.

Under "References Cited"
    One reference has been omitted, namely,
    3,814,199 to Jones Col. 3, line 46, "sperical" should be --spherical--

Col. 7, line 31, "or" should be --of--

Col. 7, line 37, "In" should be --It--

Col. 9, line 40, "claim 6" should be --claim 9--

Signed and Sealed this twenty-ninth Day of June 1976

[SEAL]

*Attest:*

RUTH C. MASON
*Attesting Officer*

C. MARSHALL DANN
*Commissioner of Patents and Trademarks*